US00RE49928E

(19) United States
(12) Reissued Patent
Shima

(10) Patent Number: US RE49,928 E
(45) **Date of Reissued Patent: *Apr. 16, 2024**

(54) SOLID STATE IMAGING DEVICE

(71) Applicant: NIKON CORPORATION, Tokyo (JP)

(72) Inventor: Toru Shima, Machida (JP)

(73) Assignee: NIKON CORPORATION, Tokyo (JP)

( * ) Notice: This patent is subject to a terminal disclaimer.

(21) Appl. No.: 16/689,233

(22) Filed: Nov. 20, 2019

Related U.S. Patent Documents

Reissue of:
(64) Patent No.: 8,643,073
Issued: Feb. 4, 2014
Appl. No.: 13/191,051
Filed: Jul. 26, 2011

U.S. Applications:
(63) Continuation of application No. 15/673,761, filed on Aug. 10, 2017, now Pat. No. Re. 47,765, which is a
(Continued)

(30) Foreign Application Priority Data

Feb. 12, 2009 (JP) ..... 2009-030312

(51) Int. Cl.
*H01L 27/146* (2006.01)
*H04N 25/627* (2023.01)
(Continued)

(52) U.S. Cl.
CPC ..... *H04N 25/673* (2023.01); *H04N 25/627* (2023.01); *H04N 25/63* (2023.01); *H04N 25/76* (2023.01); *H04N 25/767* (2023.01)

(58) Field of Classification Search
CPC ..... H04N 5/18; H04N 5/185; H04N 5/3598; H04N 5/361; H04N 5/3655; H04N 5/374; H04N 5/3742; H04N 5/378
See application file for complete search history.

(56) References Cited

U.S. PATENT DOCUMENTS 5,659,355 A * 8/1997 Barron et al. ..... 348/245
6,587,143 B1 * 7/2003 Boisvert ..... 348/241
(Continued)

FOREIGN PATENT DOCUMENTS

JP 2004-222273 A 8/2004
JP A-2004-222273 8/2004
(Continued)

OTHER PUBLICATIONS

Mar. 16, 2010 International Search Report issued in International Patent Application No. PCT/JP2010/000826.
(Continued)

*Primary Examiner* — James A Menefee
(74) *Attorney, Agent, or Firm* — Oliff PLC

(57) ABSTRACT

A plurality of pixels PX include effective pixels and optical black pixels. Signal lines VL are provided corresponding to each column of the pixels PX and supplied with output signals of the pixels PX of the corresponding column. Clip transistors CL are provided corresponding to the respective signal lines VL and limit a potential of the corresponding vertical signal lines VL based on a gate potential. At least in a predetermined operating mode, a potential Vclip_dark is supplied to a gate of one of the clip transistors CL corresponding to at least one pixel column formed of the optical black pixels when reading a noise level from the pixels PX corresponding to the clip transistors CL and when reading a data level from the pixels PX corresponding to the clip transistors CL.

13 Claims, 4 Drawing Sheets

Related U.S. Application Data continuation of application No. 15/013,319, filed on Feb. 2, 2016, now Pat. No. Re. 46,551, which is an application for the reissue of Pat. No. 8,643,073, which is a continuation of application No. PCT/JP2010/000826, filed on Feb. 10, 2010.

(51) Int. Cl.

| | |
|---|---|
| ***H04N 25/63*** | (2023.01) |
| ***H04N 25/673*** | (2023.01) |
| ***H04N 25/76*** | (2023.01) |
| ***H04N 25/767*** | (2023.01) |

(56) References Cited

U.S. PATENT DOCUMENTS

| | | | | |
|---|---|---|---|---|
| 6,903,768 | B1 * | 6/2005 | Ohsawa et al. | 348/241 |
| 7,119,387 | B2 * | 10/2006 | Ohkawa | 257/292 |
| 7,361,899 | B2 * | 4/2008 | Iida | 250/338.4 |
| 7,394,491 | B2 * | 7/2008 | Bae et al. | 348/241 |
| 7,471,230 | B2 * | 12/2008 | Tooyama et al. | 241/164 |
| 7,646,412 | B2 * | 1/2010 | Hisamatsu et al. | 348/257 |
| 7,667,171 | B2 * | 2/2010 | Kasuga et al. | 250/208.1 |
| 8,179,461 | B2 * | 5/2012 | Suzuki et al. | 348/294 |
| 8,643,073 | B2 | 2/2014 | Shima | |
| RE46,551 | E * | 9/2017 | Shima | H04N 5/3655 |
| RE47,765 | E * | 12/2019 | Shima | H04N 5/3742 |
| 2001/0025969 | A1 * | 10/2001 | Inui | 257/225 |
| 2001/0028392 | A1 * | 10/2001 | Yamamoto et al. | 348/207 |
| 2003/0002093 | A1 * | 1/2003 | Hynecek | 358/513 |
| 2004/0008270 | A1 * | 1/2004 | Hisamatsu et al. | 348/257 |
| 2004/0155973 | A1 | 8/2004 | Bea et al. | |
| 2005/0243193 | A1 | 11/2005 | Gove et al. | |
| 2006/0044414 | A1 | 3/2006 | Lee et al. | |
| 2006/0227226 | A1 | 10/2006 | Olsen | |
| 2007/0008206 | A1 * | 1/2007 | Tooyama et al. | 341/155 |
| 2007/0080376 | A1 * | 4/2007 | Adachi et al. | 257/239 |
| 2007/0188641 | A1 | 8/2007 | Jang | |
| 2007/0247533 | A1 * | 10/2007 | Hisamatsu et al. | 348/257 |
| 2008/0094271 | A1 * | 4/2008 | Tooyama et al. | 341/155 |
| 2008/0143862 | A1 | 6/2008 | Suwa | |
| 2009/0015696 | A1 | 1/2009 | Ishida | |
| 2009/0134433 | A1 * | 5/2009 | Jung | 257/239 |
| 2010/0134646 | A1 * | 6/2010 | Tamura | 348/222.1 |
| 2010/0134667 | A1 * | 6/2010 | Suzuki et al. | 348/294 |
| 2010/0289935 | A1 * | 11/2010 | Ohno | 348/306 |

FOREIGN PATENT DOCUMENTS

| | | | |
|---|---|---|---|
| JP | 2007-043324 | A | 2/2007 |
| JP | A-2007-043324 | | 2/2007 |
| JP | 2007-104222 | A | 4/2007 |
| JP | A-2007-104222 | | 4/2007 |
| JP | 2008-042674 | A | 2/2008 |
| JP | A-2008-42674 | | 2/2008 |
| WO | 2007066893 | A1 | 6/2007 |

OTHER PUBLICATIONS

May 7, 2013 Office Action issued in Japanese Patent Application No. 2009-030312.

Nov. 5, 2013 Office Action issued in Japanese Patent Application No. 2009-030312.

Oct. 11, 2012 Restriction/Election Requirement issued in U.S. Appl. No. 13/191,051.

Dec. 18, 2012 Office Action issued in U.S. Appl. No. 13/191,051.

Sep. 25, 2013 Notice of Allowance issued in U.S. Appl. No. 13/191,051.

Mar. 18, 2015 Office Action issued in Taiwanese Patent Application No. 099104446.

Feb. 16, 2017 Notice of Allowance issued in U.S. Appl. No. 15/013,319.

Apr. 27, 2017 Notice of Allowance issued in U.S. Appl. No. 15/013,319.

Dec. 7, 2017 Office Action issued in U.S. Appl. No. 15/673,761.

May 29, 2019 Office Action issued in U.S. Appl. No. 15/673,761.

International Preliminary Report on Patentability dated Mar. 16, 2010 in International Application No. PCT/JP2010/000826 (with translation).

International Search Report dated Mar. 16, 2010 in International Application No. PCT/JP2010/000826.

Office Action issued May 7, 2013 in counterpart Japanese Patent Application No. 2009-030312 (with translation).

Partial English translation of the relevant section of JP 2007-104222A (previously submitted on Jul. 26, 2011).

Partial English translation of the relevant sections of JP 2008-042674A (previously submitted on Jul. 26, 2011).

* cited by examiner

SOLID STATE IMAGING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

[This application is a continuation application of International Application No. PCT/JP2010/000826, filed on Feb. 10, 2010, designating the U.S., in which the International Application claims a priority date of Feb. 12, 2009, based on prior filed Japanese Patent Application No. 2009-030312, the entire contents of which are incorporated herein by reference.]*This is a Continuation Reissue of Reissue application Ser. No. 15/673,761 filed Aug. 10, 2017, which is a Continuation Reissue of Reissue application Ser. No. 15/013,319 filed Feb. 2, 2016, which is a Reissue of U.S. Pat. No. 8,643,073, issued Feb. 4, 2014, which issued from U.S. application Ser. No. 13/191,051, filed Jul. 26, 2011, which is a Continuation of International Application No. PCT/JP2010/000826, filed Feb. 10, 2010, which claims foreign priority to Japanese Application No. 2009-030312, filed in the Japan Patent Office on Feb. 12, 2009. The disclosure of each of the prior applications is hereby incorporated by reference herein in its entirety.*

BACKGROUND

1. Field

The present application relates to a solid state imaging device.

2. Description of the Related Art

In a solid state imaging device of XY address type such as MOS type, generally, CDS (correlation double sampling) is performed to read a data level (including an original signal level and a noise level) and a noise level from pixels, and obtain a difference between them.

In such a solid state imaging device, if light with high luminance is incident when the noise level is read, the noise level output from pixels is a level such that a level based on the high luminance light is added to the original noise level. As a result, there is a small difference between the data level and the noise level, and a high luminance part as of the sun appears to be dark. Such a phenomenon is called a dark sun or the like.

To prevent such a phenomenon, in a solid state imaging device disclosed in Japanese Unexamined Patent Application Publication No. 2004-222273, a vertical signal line to which an output signal of pixels is supplied is provided with a clip transistor (which may also he referred to as a clamp transistor) which limits the potential of the vertical signal line based on a gate potential. To the gate of the clip transistor, different potentials are supplied when the noise level is read and when the data level is read. Accordingly, the noise level (reset signal) is limited to a predetermined potential. Therefore, a sufficient difference corresponding to the incident light can be obtained between the data level and the noise level, thereby preventing the aforementioned phenomenon.

Now, in the solid state imaging device, besides effective pixels which photoelectrically convert incident light to generate a signal corresponding to the incident light, optical black pixels generating a signal of a black standard level are provided. The optical black pixels are used for correcting the black level in a screen, or the like. The optical black pixels have, for example, basically the same structure as the effective pixels, but also have a structure in which a photoelectric conversion part, such as a photodiode, is shielded from light, or a structure in which the photoelectric conversion part is removed from the effective pixels. Optical black pixel areas are disposed at, for example, an upper end or lower end and a left end or right end of an effective pixel area. Regarding reading of the pixels, the optical black pixels and the effective pixels are handled in exactly the same manner.

To prevent the dark sun also in the solid state imaging device having the optical black pixels besides the effective pixels, similarly to the solid state imaging device of Japanese Unexamined Patent Application Publication No. 2004-222273, the clip transistor may be provided on the vertical signal line. At this time, in accordance with the common technical knowledge such that the optical black pixels and the effective pixels are handled in exactly the same manner with respect to reading of pixels, the clip transistor should be provided not only on the vertical signal line of a pixel column including the effective pixels but on the vertical signal line of a pixel column formed of the optical black pixels. Further, not only in a reading period of pixel rows including the effective pixels but also in a reading period of the pixel column formed of the optical black pixels, different potentials are supplied to the gate of the clip transistor between when the noise level is read and when the data level is read.

When the clip transistor is thus employed in the solid state imaging device having the optical black pixels in accordance with the common technical knowledge, no particular problem occurs unless a white defect (constantly outputting a level corresponding to a bright signal) occurs in the optical black pixels. However, as a result of studies conducted by the present inventor, if the white defect occurs in the optical black pixels when the clip transistor is employed as described above, this white defect becomes manifest. It was found that, as a consequence, the yield of solid state imaging devices decreases, and cost increase is inevitable. This point will be described later in detail with respect to a comparative example.

In addition, normally, the optical black pixels should always output a black level. However, it is empirically confirmed that the white defect occurs in optical black pixels with a constant probability.

The present application is made in view of such a situation, and it is a proposition of the application to provide a solid state imaging device capable of suppressing the white defect from becoming manifest when the white defect occurs in the optical black pixels, although it is also capable of preventing the dark sun, thereby leading to improvement in yield.

SUMMARY

As measures to solve the above-described problems, the following aspects are proposed. A solid state imaging device according to a first aspect includes (i) a plurality of pixels disposed two-dimensionally including effective pixels generating a signal corresponding to incident light and optical black pixels generating a signal at a black standard level, (ii) a plurality of signal lines provided corresponding to each column of the pixels and supplied with output signals of the pixels, (iii) a plurality of transistors provided corresponding to the respective signal lines and limiting a potential of the signal lines based on a gate potential, and (iv) a gate potential providing unit providing an aligned potential to a gate of one of the transistors corresponding to at least one pixel column formed of the optical black pixels when reading a noise level from the pixels corresponding to the transistors and when reading a data level from the pixels corresponding to the transistors.

A solid state imaging device according to a second aspect is such that, in the first aspect, the gate potential providing unit provides different potentials to gates of the transistors corresponding to pixel columns excluding the at least one pixel column when reading a noise level from the pixels corresponding to the transistors and when reading a data level from the pixels corresponding to the transistors at least in a predetermined operating mode.

A solid state imaging device according to a third aspect includes (i) a plurality of pixels disposed two-dimensionally including effective pixels generating a signal corresponding to incident light and optical black pixels generating a signal at a black standard level, (ii) a plurality of signal lines provided corresponding to respective columns of the pixels and supplied with output signals of the pixels, (iii) a plurality of transistors provided corresponding to the respective signal lines and limiting a potential of the signal lines based on a gate potential, and (iv) a gate potential providing unit providing an aligned potential to gates of the respective transistors during a reading period of at least one pixel row formed of the optical black pixels when reading a noise level from the pixels corresponding to the transistors and when reading a data level from the pixels corresponding to the transistors.

A solid state imaging device according to a fourth aspect is such that, in the third aspect, the gate potential providing unit provides different potentials to gates of the respective transistors during a reading period of pixel rows excluding the at least one pixel row when reading a noise level from the pixels corresponding to the transistors and when reading a data level from the pixels corresponding to the transistors at least in a predetermined operating mode.

A solid state imaging device according to a fifth aspect includes (i) a plurality of pixels disposed two-dimensionally including effective pixels generating a signal corresponding to incident light and optical black pixels generating a signal at a black standard level, (ii) a plurality of signal lines provided corresponding to respective columns of the plurality of pixels and supplied with output signals of the pixels, (iii) a plurality of transistors provided corresponding to the respective signal lines and limiting a potential of the signal lines based on a gate potential, and (iv) a gate potential providing unit providing a gate potential to gates of the respective transistors. At least in a predetermined operating mode, the gate potential providing unit provides an aligned potential to a gate of one of the transistors corresponding to at least one pixel column formed of the optical black pixels when reading a noise level from the pixels corresponding to the transistors and when reading a data level from the pixels corresponding to the transistors. Further, the gate potential providing unit provides an aligned potential to gates of the respective transistors during a reading period of at least one pixel row formed of the optical black pixels when reading a noise level and when reading a data level from the pixels corresponding to the transistors at least in the predetermined operating mode.

A solid state imaging device according to a sixth aspect is such that, in the fifth aspect, (i) the gate potential providing unit provides different potentials to gates of the transistors corresponding to pixel columns excluding the at least one pixel column when reading a noise level and when reading a data level from the pixels corresponding to the transistors at least in the predetermined operating mode, and (ii) the gate potential providing unit provides different potentials to gates of the transistors corresponding to pixel columns excluding the at least one pixel column during a reading period of pixel rows excluding the at least one pixel row when reading a noise level and when reading a data level from the pixels corresponding to the transistors at least in the predetermined operating mode.

A solid state imaging device according to a seventh aspect includes (i) a plurality of pixels disposed two-dimensionally including effective pixels generating a signal corresponding to incident light and optical black pixels generating a signal at a black standard level, (ii) a plurality of signal lines provided corresponding to respective columns of the pixels and supplied with output signals of the pixels, (iii) a plurality of transistors provided corresponding to the respective signal lines and limiting a potential of the signal lines based on a gate potential, and (iv) a gate potential providing unit providing an aligned potential to gates of the transistors provided corresponding to the optical black pixels when reading a noise level and when reading a data level from the optical black pixels. The solid state imaging device according to an eighth aspect further includes, in the first aspect, a difference obtaining unit obtaining a difference between the noise level and the data level read from the respective pixels.

The solid state imaging device according to a ninth aspect further includes, in the third aspect, a difference obtaining unit obtaining a difference between the noise level and the data level read from the respective pixels.

The solid state imaging device according to a tenth aspect further includes, in the fifth aspect, a difference obtaining unit obtaining a difference between the noise level and the data level read from the respective pixels.

The solid state imaging device according to an eleventh aspect further includes, in the seventh aspect, a difference obtaining unit obtaining a difference between the noise level and the data level read from the respective pixels.

DETAILED DESCRIPTION OF THE EMBODIMENTS

Hereinafter, a solid state imaging device according to the present invention will be described with reference to the drawings.

[First Embodiment]

Figure 1:
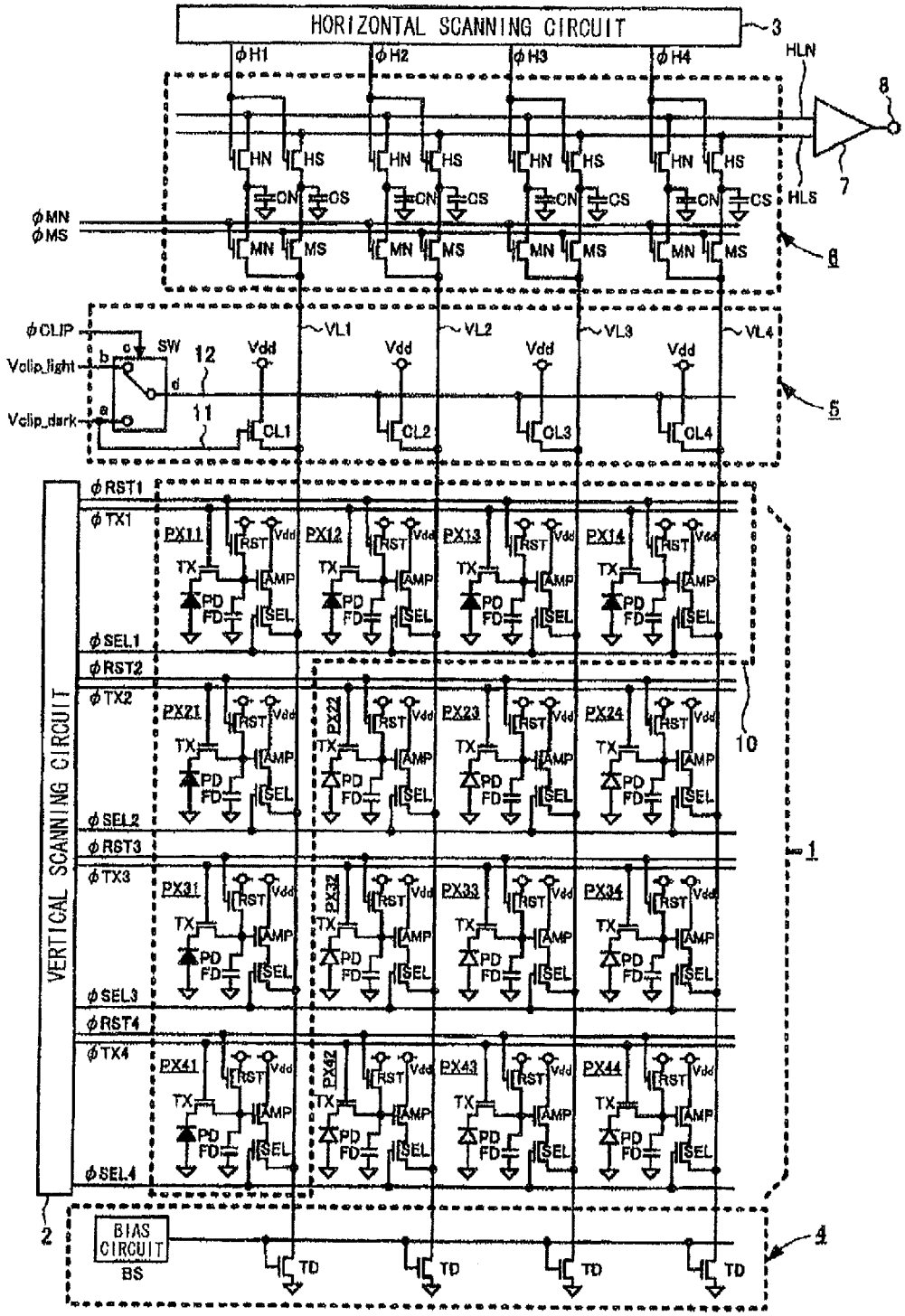
FIG. 1 is a circuit diagram illustrating a solid state imaging device according to a first embodiment.

FIG. 1 is a circuit diagram illustrating a solid state imaging device according to a first embodiment of the present invention. The solid state imaging device according to this embodiment is formed as a CMOS type solid state imaging device.

As illustrated in FIG. 1, the solid state imaging device according to this embodiment has a pixel unit 1, a vertical scanning circuit 2, a horizontal scanning circuit 3, vertical signal lines VL, a constant current source 4 coupled to the vertical signal lines VL, a clip circuit 5, a sample-and-hold unit 6, and a differential amplifier 7 forming an output amplifier. Here, the pixel unit 1 is formed of plural pixels PX (4×4 pixels PX are illustrated in FIG. 1) which are disposed two-dimensionally. Further, the vertical signal lines VL are provided corresponding to respective columns of the pixels PX. To each vertical signal line VL, an output signal from the corresponding column of pixels PX is supplied. In FIG. 1, Vdd denotes a power supply potential. When each vertical signal line VL is distinguished, the vertical signal line of n-th column is denoted by a symbol VLn.

In the following description, it is assumed that the number of pixels PX is 4×4. However, it is needless to mention that the number thereof is not limited. When each pixel PX is distinguished, the pixel of m-th row and nth column is denoted by a symbol PXmn. In this embodiment, the pixels PX of the first row and the pixels PX of the first column (that is, PX11, PX12, PX13, PX14, PX21, PX31, PX41) are optical black pixels (hereinafter referred to as "OP pixels") generating a signal at a black standard level. Further, in this embodiment, the remaining pixels (PX22, PX23, PX24, PX32, PX33, PX34, PX42, PX43, PX44) are effective pixels which photo-electrically convert incident light to generate a signal corresponding to the incident light. Note that in FIG. 1, the OB pixels among the pixels PX are surrounded by a dashed line 10.

In this embodiment, the effective pixels among the pixels PX have a photodiode PD, a floating diffusion FD, an amplifying transistor AMP, a transfer transistor TX, a reset transistor RST, and a selection transistor SEL, similarly to the pixels of a typical CMOS solid state imaging device. The photodiode PD functions as a photoelectric conversion part generating and storing a signal charge corresponding to incident light. The floating diffusion FD functions as a charge-voltage conversion part receiving the signal charge and converting the signal charge into a voltage. The amplifying transistor AMP functions as an amplifying part outputting a signal corresponding to the potential of the floating diffusion FD. The transfer transistor TX functions as a charge transfer part transferring a charge from the photodiode PD to the floating diffusion ED. The reset transistor RST functions as a reset part resetting the potential of the floating diffusion FD. The selection transistor SEL functions as a selection part selecting the pixel PX of interest. Further, in each pixel, the photodiode PD, the floating diffusion FD, the amplifying transistor AMP, the transfer transistor TX, the reset transistor RST, and the selection transistor SEL are coupled as illustrated in FIG. 1. Note that in this embodiment, the transistors AMP, TX, RST, SEL of the pixels PX are all nMOS transistors. The OB pixels among the pixels PX have the same structure as the effective pixels among the pixels PX, except that the photodiode PD is shielded from light. In addition, in the OB pixels, for example the photodiode PD may be removed.

On every row, the gates of the transfer transistors TX of the respective pixels PX are coupled to a control line which supplies the transfer transistors TX with a control signal ϕTX to control the transfer transistors TX from the vertical scanning circuit 2. On every row, the gates of the reset transistors RST are coupled to a control line which supplies the reset transistors RST with a control signal ϕRST to control the reset transistors RST from the vertical scanning circuit 2. On every row, the gates of the selection transistors SEL are coupled to a control line which supplies the selection transistors SEL with a control signal ϕSEL to control the selection transistors SEL from the vertical scanning circuit 2. When each control signal ϕTX is distinguished by row, the control signal ϕTX of m-th row is denoted by a symbol ϕTXm. The same applies to the control signals ϕRST, ϕSEL.

The photodiode PD of each effective pixel among the pixels PX generates a signal charge corresponding to the light quantity (subject light) of incident light. The photodiode PD of each OB pixel among the pixels PX does not receive incident light, and hence does not generate the signal charge corresponding to the light quantity (subject light) of the incident light. The transfer transistor TX of each pixel PX turns on during a high-level period of a transfer pulse (control signal) ϕTX and transfers the charge of the photodiode PD to the floating diffusion FD. The reset transistor RST turns on during a high-level period of a reset pulse (control signal) ϕRST and resets the floating diffusion FD.

The amplifying transistor AMP of each pixel PX has a drain coupled to the power supply potential Vdd, a gate coupled to the floating diffusion FD, and a source coupled to the drain of the selection transistor SEL. Further, the amplifying transistor AMP of each pixel PX forms a source follower circuit with a transistor TD as a load. Transistors TD form the constant current source 4 and are provided corresponding to the respective vertical signal lines VL. The drain of each transistor TD is coupled to one of the vertical signal lines VL, and the source of each transistor TD is grounded. The gates of the transistors TD are coupled in common. To the gate of each transistor TD, a constant voltage is supplied from a bias circuit BS. Accordingly, when the selection transistor SEL of a pixel PX corresponding to a vertical signal line VL is turned on, the constant current source 4 applies a current to this vertical signal line VL. This current is a source follower bias current of the amplifying transistor AMP of this pixel PX.

The amplifying transistor AMP of each pixel PX outputs a voltage to the vertical signal line VL via the selection transistor SEL corresponding to a voltage value of the floating diffusion FD. The selection transistor SEL turns on during a high-level period of a selection pulse (control signal) ϕSEL and couples the source of the amplifying transistor AMP to the vertical signal line VL.

The vertical scanning circuit 2 receives a drive pulse (not illustrated) from outside the element and outputs the selection pulse ϕSEL, the reset pulse ϕRST, and the transfer pulse ϕTX to every row of the pixels PX. Further, the horizontal scanning circuit 3 receives a drive pulse (not illustrated) from outside the element and outputs a horizontal scanning signal 4H to every column. When each horizontal scanning signal ϕH is distinguished by column, the horizontal scanning signal of n-th column is denoted by a symbol ϕHn.

The sample-and-hold unit 6 samples and holds a signal corresponding to the signal of each vertical signal line VL (which is the signal of each vertical signal line VL in this embodiment but may be, for example, a signal resulting from amplifying the signal of the vertical signal line VL with a column amplifier) according to sampling control signals ϕMN, ϕMS. Further, the sample-and-hold unit 6 supplies the held signal to horizontal signal lines HLN, HLS according to the horizontal scanning signal ϕH.

The sample-and-hold unit 6 has data level storage capacitors CS and noise level storage capacitors CN, data level sampling switches MS, noise level sampling switches MN, data level horizontal transfer switches HS, and noise level horizontal transfer switches HN. The data level storage capacitors CS and the noise level storage capacitors CN are provided corresponding to the respective vertical signal lines VL. The data level sampling switches MS cause the data level storage capacitors CS to store a data level (level including an original signal level and a noise level) from the pixels PX according to the data level sampling control signal ϕMS. The noise level sampling switches MN cause the noise level storage capacitors CN to store a noise level according to the noise level sampling control signal ϕMN. The data level horizontal transfer switches HS supply the data level stored in the data level storage capacitors CS to the data level horizontal signal line HLS according to the horizontal scanning signal ϕH. The noise level horizontal transfer switches HN supply the noise level stored in the noise level storage capacitors CN to the noise level horizontal signal line HLN according to the horizontal scanning signal ϕH. In this embodiment, there are provided transistors (not illustrated) for resetting the horizontal signal lines HLN, HLS respectively to a predetermined potential at a predetermined timing. In this embodiment, all the switches MS, MN, HS, HN are an nMOS transistor.

The gates of the respective data level sampling switches MS are coupled in common. The data level sampling control signal ϕMS is supplied to the gates of the respective data level sampling switches MS. When the data level sampling switches MS turn on according to the data level sampling control signal ϕMS, the data levels on the vertical signal lines VL are stored in the corresponding data level storage capacitors CS. The gates of the respective noise level sampling switches MN are coupled in common. The noise level sampling control signal ϕMN is supplied to the gates of the respective noise level sampling switches MN. When the noise level sampling switches MN turn on according to the noise level sampling control signal ϕMN, the noise levels on the vertical signal lines VL are stored in the corresponding noise level storage capacitors CN.

In every column, the gates of the data level horizontal transfer switch HS and the noise level horizontal transfer switch HN are coupled in common. The horizontal scanning signal ϕH of the corresponding column is supplied from the horizontal scanning circuit 3 to the respective gates of the data level horizontal transfer switch HS and the noise level horizontal transfer switch HN. When the horizontal transfer switches HS, HN of each column turn on according to the horizontal scanning signal ϕH of this column, the data level and the noise level stored respectively in the data level storage capacitor CS and the noise level storage capacitor CN of the corresponding column are output to the data level horizontal signal line HLS and the noise level horizontal signal line HLN, respectively. Then, the differential amplifier 7 obtains the difference between the data level and the noise level, and a differential signal of the difference is output via an output terminal 8. Thus, correlation double sampling is achieved. From this differential amplifier 7, the original signal from which fixed pattern noise and so on are removed can be obtained as an image signal. In addition, instead of the differential amplifier 7, two output amplifiers amplifying the signals on the horizontal signal lines HLS, HLN respectively may be provided, and the difference between output signals of the two output amplifiers may be obtained by a differential amplifier or the like provided outside the element.

In this embodiment, the clip circuit 5 has clip transistors CL, a switching circuit SW, and wires 11, 12. The clip transistors CL are provided corresponding to the respective vertical signal lines VL and limit the potentials of the corresponding vertical signal lines VL based on a gate potential. When the clip transistors CL are distinguished by column, the clip transistor of n-th column is denoted by a symbol CLn. The drain of each clip transistor CL is coupled to the power supply potential Vdd. The source of each clip transistor CL is coupled to the corresponding vertical signal line VL. In this embodiment, each clip transistor CL is an nMOS transistor.

The switching circuit SW has a first input part a coupled to a relatively high predetermined potential Vclip_dark, a second input part b coupled to a relatively low predetermined potential Vclip_light, a control input part c receiving a switching control signal ϕCLIP controlling a switching state of the switching circuit SW, and an output part d. When the switching control signal ϕCLIP is at high level, the first input part a and the output part d are coupled to each other, and meanwhile the second input part b and the output part d are released from each other. Thus, a predetermined potential clip_dark appears at the output part d. Conversely, when the switching control signal ϕCLIP is at low level, the first input part a and the output part d are released from each other, and meanwhile the second input part b and the output part d are coupled to each other. Thus, a predetermined potential clip_light appears at the output part d. The switching control signal ϕCLIP is supplied from a control unit (not illustrated) outside the element.

In this embodiment, the gate of the clip transistor CL1 of the first column corresponding to the pixel column (first pixel column) formed of the OB pixels is coupled constantly to the predetermined potential Vclip_dark by the wire 11. On the other hand, the gates of the clip transistors CL2 to CL4 of the second column to the fourth column corresponding to the other pixel columns (second to fourth pixel columns) are coupled to the output part d of the switching circuit SW by the wire 12. In this embodiment, the wires 11, 12 and the switching circuit SW form a gate potential providing unit providing a gate potential to the clip transistors CL1 to CL4.

In this embodiment, due to that the amplifying transistor AMP and the selection transistor SEL are an nMOS transistor, and so on, the stronger the incident light on the effective pixel of interest, the lower the data level read from this effective pixel to the corresponding vertical signal line VL becomes. When the predetermined potential clip_dark is applied to the gate of a clip transistor CL, the potential of the corresponding vertical signal line VL is limited to the potential corresponding to the predetermined potential clip_dark. When the predetermined potential clip_light is applied to the gate of a clip transistor CL, the potential of the corresponding vertical signal line VL is limited to the potential corresponding to the predetermined potential clip_light. The predetermined potential clip_dark is set to the potential corresponding to a vertical signal line potential suitable for preventing a dark sun (referred to as "dark sun preventing potential" for convenience of description).

Here, the predetermined potential clip_light is limited so that the levels of the vertical signal lines VL do not decrease to a potential which causes the transistors TD of the constant current source 4 to turn off, and meanwhile set to be capable of changing to a potential as low as possible. By limiting the predetermined potential so that the potentials of the vertical signal lines VL do not decrease to a potential which causes the transistors TD of the constant current source 4 to turn off, the transistors TD of the constant current source 4 would not turn off even when the incident light on the effective pixels is strong. Thus, variation in current values of the respective vertical signal lines VL by the constant current source 4 is suppressed to minimum. Accordingly, variation in current value of the pixel current source is suppressed even when a high-luminance subject is imaged, and thus an effect to suppress fluctuation of the image accompanying fluctuation of consumed current values of elements (which is referred to as "fluctuation suppressing effect") is obtained. However, in the present invention, the fluctuation suppressing effect need not necessarily be obtained. When it is not necessary to obtain the fluctuation suppressing effect, for example, the ground potential may be coupled to the second input part b of the switching circuit SW instead of the predetermined potential clip_light. This also applies to embodiments which will be described later. Note that for convenience of description, the vertical signal line potential corresponding to the predetermined potential clip_light will be referred to as "current value variation suppressing potential". As can be understood from the description above, in this embodiment, the current value variation suppressing potential is lower than the dark sun preventing potential.

Figure 2:
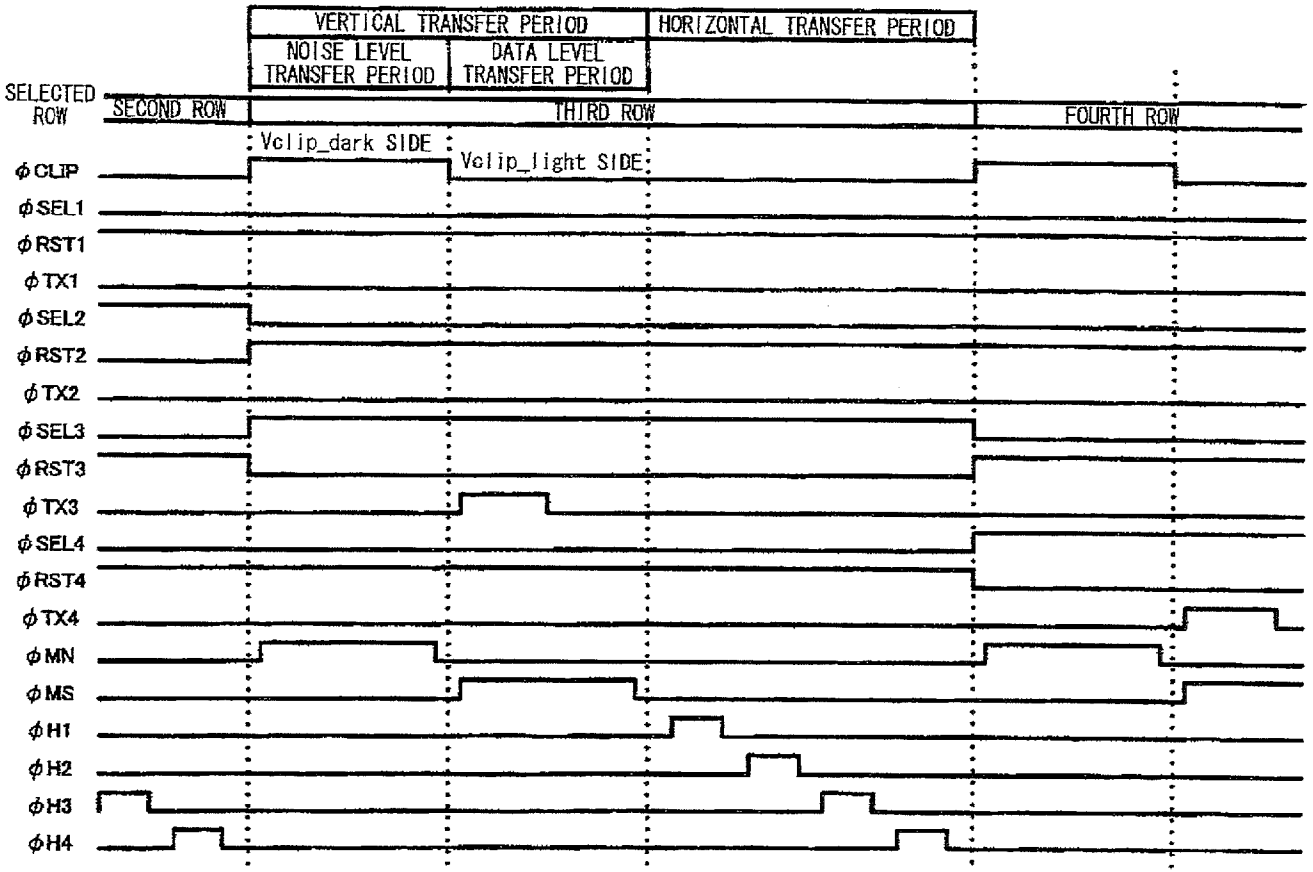
FIG. 2 is a timing chart illustrating a reading operation in a sequential imaging mode of the solid state imaging device according to the first embodiment.

FIG. 2 is a timing chart illustrating an example of a reading operation in a sequential imaging mode of the solid state imaging device according to this embodiment. Here, the sequential imaging operation mode is a mode in which imaging is performed repeatedly by an electronic shutter operation in a state that the incident light is sequentially incident on the solid state imaging device (that is, when a mechanical shutter is used for example, the state that the mechanical shutter is kept open), such as what is called a live-view mode or a moving-image imaging mode. The sequential imaging operation mode is in contrast to what is called a single-shot mode in which the mechanical shutter is opened and closed for every imaging.

In this embodiment, in the sequential imaging mode, in a state that the mechanical shutter is opened, an operation to sequentially select the first row to the fourth row one by one is repeated, and the same operation is performed sequentially for every row. Thus, imaging of one image is repeated sequentially. FIG. 2 illustrates that the pixels PX of the third row are selected and states before and after the selection. In the description below, m should be read as 3 when referring to FIG. 2.

In a period in which the pixels PX of the m-th row are not selected, the selection pulse ϕSELm of the m-th row is at low level, and the reset pulse ϕRST of the m-th row is at high level.

In a period in which the pixels PX of the m-th row are selected (m-th row selection period, that is, a reading period of the pixels PX of the m-th row), the pixels PX of the m-th row are selected by the vertical scanning circuit 2, the reset pulse ϕRST of the m-th row changes to low level, and the reset transistors RST of the m-th row turn off. Further, in the m-th row selection period, the selection pulse ϕSELm of the m-th row changes to high level, and the selection transistors Sam of the m-th row turn on. By turning on of the selection transistors SEL of the m-th row, the sources of the amplifying transistors AMP of the m-th row are coupled to the vertical signal lines VL. Then, the amplifying transistors AMP of the m-th row operate as a source follower circuit by the constant current source 4.

The m-th row selection period is divided into a vertical transfer period and a subsequent horizontal transfer period (horizontal scanning period). The vertical transfer period is divided into a noise level transfer period and a subsequent data level transfer period.

In the noise level transfer period of the m-th row selection period, the selection transistors SEL of the m-th row turn on, and simultaneously the reset transistors RST of the m-th row turn off, thereby changing the gate voltage of the amplifying transistor AMP of a pixel PX of the m-th row to a floating state. Thus, the reset level of the pixel PX of the m-th row appears as a noise level on the vertical signal line VL. At this time, in a major part of the noise level transfer period, the noise level sampling pulse (control signal) ϕMN changes to high level, and the noise level sampling switches MN turn on. Accordingly, the noise level of the pixel PX of the m-th row is stored in the noise level storage capacitor CN. This operation is carried out simultaneously in parallel on the pixels PX of the respective columns of the m-th row.

Next, in a major part of the data level transfer period of the m-th row selection period, the data level sampling pulse (control signal) ϕMS changes to high level, and the data level sampling switches MS turn on. Further, in a front period in the data level transfer period of the m-th row selection period, the transfer pulse ϕTXm of the m-th row changes to high level, and the transfer transistors TX of the m-th row turn on. By turning on of the transfer transistors TX of the m-th row, the charge of the photodiode PD of a pixel PX of the m-th row is transferred to the corresponding floating diffusion FD. At this time, when this pixel PX is an effective pixel, the signal charge photoelectrically converted and stored in the photodiode PD is transferred to the corresponding floating diffusion FD. On the other hand, when the pixel PX is an OB pixel, the charge (dark current component) existing in the photodiode PD is transferred to the corresponding floating diffusion FD. Thus, the voltage of the floating diffusion FD becomes a voltage corresponding to the transferred charge amount, and this voltage is applied to the gate electrode of the amplifying transistor AMP. As a result, a data level including light information (when it is effective pixel) of the m-th row or black level reference information (when it is OB pixel) of the pixel PX appears on the vertical signal line VL. At this time, since the data level sampling switch MS is on, the data level of the pixel PX of the m-th row is stored in the data level storage capacitor CS. This operation is carried out simultaneously in parallel on the pixels PX of the respective columns of the m-th row.

Thus, sampling of output signals of the pixels PX of the m-th row is performed in the vertical transfer period. At this time, in every column, the noise level of the pixel PX of the m-th row is stored in the noise level storage capacitor CN, and the data level of the pixel PX of the m-th row is stored in the data level storage capacitor CS.

In the horizontal transfer period in the m-th row selection period, the noise level horizontal transfer switches HN and the data level horizontal transfer switches HS corresponding to the respective vertical signal lines VL are turned on sequentially by horizontal scanning by the horizontal scanning signal ϕH from the horizontal scanning circuit 3. Accordingly, the noise levels and the data levels stored respectively in the storage capacitors CN, CS corresponding to the respective vertical signal lines VL are read sequentially to the noise level horizontal signal line HLN and the data level horizontal signal line HLS, respectively. Then, a difference between them is obtained by the differential amplifier 7 and a differential signal thereof is output from the output terminal 8. The differential signal is the original image signal or the black level standard signal, from which fixed pattern noise and so on are removed.

Next, the (m+1)-th row selection period starts, and the same operation as that performed for the m-th row is performed for the (m+1)-th row, and thereafter the same operation is performed repeatedly.

Additionally, in this embodiment, only during the noise level transfer period in the selection period of any row, the switching control signal ϕCLIP is turned to high level, and the predetermined potential clip_dark is supplied to the gates of the clip transistors CL2 to CL4 of the second column to the fourth column by the switching circuit SW. Further, during the data level transfer period and the horizontal transfer period, the switching control signal ϕCLIP is turned to low level, and the predetermined potential clip_light is supplied to the gates of the clip transistors CL2 to CL4 of the second column to the fourth column by the switching circuit SW. On the other hand, to the gate of the clip transistor CL1 of the first column, the predetermined potential clip_light is supplied constantly through all the periods by the wire 11 irrespective of the switching control signal ϕCLIP.

Therefore, regarding all the effective pixels PX22, PX23, PX24, PX32, PX33, PX34, PX42, PX43, PX44, during the noise level transfer period of the effective pixels PX (and hence when the noise level is read from the effective pixels PX), the predetermined potential clip_dark is supplied to the gate of the clip transistor CL corresponding to the effective pixels PX. Further, during the data level transfer period of the effective pixels PX (and hence when the data level is read from the effective pixels PX), the predetermined potential clip_light is supplied to the gate of the clip transistor CL corresponding to the effective pixels PX. Accordingly, regarding all the effective pixels PX22, PX23, PX24, PX32, PX33, PX34, PX42, PX43, PX44, the noise level is limited to the dark sun preventing potential to thereby prevent the dark sun, and the data level is limited to the current value variation suppressing potential to thereby obtain the fluctuation suppressing effect.

Further, regarding the OB pixels PX11, PX21 PX31, PX41 of the first column, the predetermined potential clip_dark is supplied to the gate of the clip transistor CL1 corresponding to the OB pixels PX during both the noise level transfer period of the OB pixels PX (and hence when the noise level is read from the OB pixels PX) and the data level transfer period of the OB pixels PX (and hence when the data level is read from the OB pixels PX). Therefore, regarding the OB pixels PX11, PX21 PX31, PX41 of the first column, both the noise level and the data level are limited to the dark sun preventing potential.

Regarding the OB pixels PX11, PX21, PX31, PX41 of the first column, when the OB pixels PX are normal, both the noise level and the data level output by the OB pixels PX is at the level corresponding to a dark signal. The level corresponding to this dark signal does not reach the dark sun preventing potential and hence is not limited in potential by the clip transistor CL1, and the noise level and the data level are at the same level. On the other hand, regarding the OB pixels PX11, PX21, PX31, PX41 of the first column, if any of the OB pixels PX has tailed and a white defect (constantly outputting a level corresponding to a bright signal) has occurred, this OB pixel is limited in potential by the clip transistor CL1. Accordingly, both the noise level and the data level become the dark sun preventing potential, and the noise level and the data level become the same level. Thus, regarding the OB pixels PX11, PX21, PX31, PX41 of the first column, either when the OB pixels PX11, PX21, PX31, PX41 are normal or when one of them fails and the white defect occurs, the noise level and the data level become the same level, and the difference signal taken from the difference therebetween becomes zero.

Therefore, regarding the OB pixels PX11, PX21, PX31, PX41 of the first column, even when the white defect has occurred in these OB pixels PX, it does not become manifest and has no influence on the obtained image.

Further, regarding the OB pixels PX12, PX13, PX14 of the first row, during the noise level transfer period of the OB pixels PX, the predetermined potential clip_dark is supplied to the gates of the clip transistors CL corresponding to the OB pixels PX. Further, during the data level transfer period of the OB pixels PX, the predetermined potential clip_light is supplied to the gates of the clip transistors CL corresponding to the OB pixels PX. Therefore, regarding the OB pixels PX12, PX13, PX14 of the first row, the noise level is limited to the dark sun preventing potential, and meanwhile the data level is limited to the current value variation suppressing potential.

Regarding the OB pixels PX12, PX13, PX14 of the first row, when the OB pixels PX are normal, both the noise level and the data level output by the OB pixels PX is at the level corresponding to a dark signal. The level corresponding to this dark signal reaches neither the dark sun preventing potential nor the current value variation suppressing potential and hence is not limited in potential by the corresponding clip transistors CL, and the noise level and the data level are at the same level. However, regarding the OB pixels PX12, PX13, PX14 of the first row, if any of the OB pixels has failed and the white defect has occurred, the noise level and the data level are limited in potential by respectively different gate potentials by the clip transistors CL. Accordingly, the noise level becomes the dark sun preventing potential, and meanwhile the data level becomes the current value variation suppressing potential, which are different levels from each other. Therefore, regarding the OB pixels PX12, PX13, PX14 of the first row, when the OB pixels PX are normal, the difference signal taken from the difference between the noise level and the data level becomes zero, but when the white defect has occurred in any of the OB pixels PX, the difference signal taken from the difference between the noise level and the data level does not become zero.

Thus, regarding the OB pixels PX12, PX13, PX14 of the first row, when the white defect has occurred in any of these OB pixels PX, the defect becomes manifest, and the quality of the obtained image decreases.

In addition, in the single-shot mode of the solid state imaging device according to this embodiment, the mechanical shutter is opened and closed in every imaging, and after the mechanical shutter is opened once and closed, a reading operation similar to that in the above-described sequential imaging mode is performed from the first row to the fourth row. However, during the single-shot mode, the switching control signal ϕCLIP is constantly set at high level, to constantly supply the predetermined potential clip_light to the gates of the clip transistors CL2 to CL4 of the second column to the fourth column.

Figure 3:
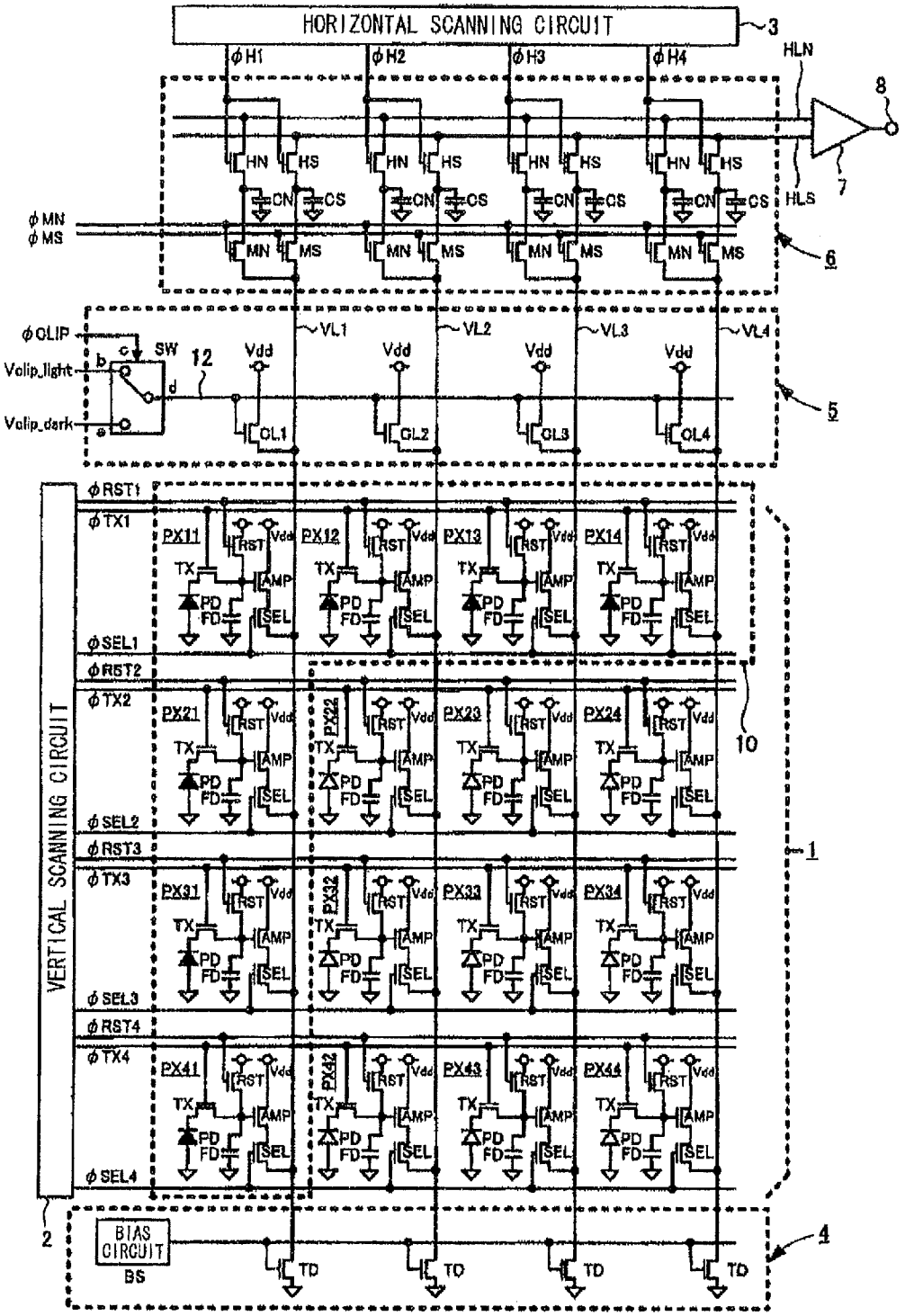
FIG. 3 is a circuit diagram illustrating a solid state imaging device according to a comparative example.

Here, a solid state imaging device according to a comparative example, which is compared with the solid state imaging device according to this embodiment, will be described. FIG. 3 is a circuit diagram illustrating the solid slate imaging device according to this comparative example, and corresponds to FIG. 1. In FIG. 3, elements which are the same as or corresponding to those in FIG. 1 are denoted by the same reference symbols, and duplicated descriptions thereof are omitted.

The solid state imaging device according to this comparative example differs from the solid state imaging device according to the first embodiment only in that the wire 11 is removed, and that the gate of the clip transistor CL1 of the first column corresponding to the pixel column formed of OB pixels (the first pixel column) is coupled to the output part d of the switching circuit SW by the wire 12, similarly to the clip transistors CL2 to CL4 of the other columns. The timing chart of a reading operation in the sequential imaging mode of the solid state imaging device according to this comparative example is the same as the timing chart (FIG.

2) of the reading operation in the sequential imaging mode of the first solid-state imaging device.

This comparative example is in accordance with the common technical knowledge such that the OB pixels and the effective pixels are handled in exactly the same manner with respect to reading of pixels PX.

In this comparative example, in the sequential imaging mode, differently from the first embodiment, regarding the OB pixels PX11, PX21, PX31, PX41 of the first column, the predetermined potential clip_dark is supplied to the gate of the clip transistor CL corresponding to the OB pixels PX during the noise level transfer period of the OB pixels PX, similarly to the OB pixels PX12, PX13, PX14 of the first row. Further, in the sequential imaging mode of the comparative example, during the data level transfer period of the OB pixels PX, the predetermined potential clip_light is supplied to the gate of the clip transistor CL corresponding to the OB pixels PX.

Therefore, in this comparative example, differently from the first embodiment, regarding the OB pixels PX11, PX21, PX31, PX41 of the first column, when the white defect has occurred in the OB pixels PX, it becomes manifest and the quality of the obtained image decreases, similarly to the OB pixels PX12, PX13, PX14 of the first row.

Thus, according to this comparative example, if the white defect occurs in any of the OB pixels PX11, PX21, PX31, PX41 of the first column, this solid state imaging device becomes a defective product, and the yield decreases.

In contrast, in the first embodiment as described above, regarding the OB pixels PX11, PX21, PX31, PX41 of the first column, the same predetermined potential clip_dark is supplied to the gate of the clip transistor CL1 corresponding to the OR pixels PX during both the noise level transfer period of the OR pixels PX and the data level transfer period of the OB pixels PX. Accordingly, even when the white defect has occurred in the OB pixels PX, it does not become manifest and has no influence on the obtained image.

Thus, according to the first embodiment, even when the white defect occurs in any one of the OB pixels PX11, PX21, PX31, PX41 of the first column, this solid state imaging device does not become a defective product, and the yield improves.

In this manner, according to this embodiment, the number of OB pixels PX in which the white defect becomes manifest can be decreased as compared to the comparative example, and hence the yield can be improved as compared to the comparative example.

Further, the difference in circuit between this embodiment and the comparative example is only a change of wiring to the gate of the clip transistor CL1 of the first column, and thus no special additional circuit is needed. Therefore, this embodiment has no increase in cost compared to the comparative example.

In addition, this embodiment is an example having only one OB pixel column, but when there are two or more OB pixel columns, the gates of the clip transistors CL corresponding to all the OB pixel columns may be coupled constantly to the predetermined potential Vclip_dark via wires. Alternatively, the gates of the clip transistors CL corresponding to part of the OB pixel columns may be coupled constantly to the predetermined potential Vclip_dark via wires, and meanwhile the gates of the clip transistors CL corresponding to the remaining OB pixel columns may be coupled to the output part d of the switching circuit SW.

[Second Embodiment]

Figure 4:
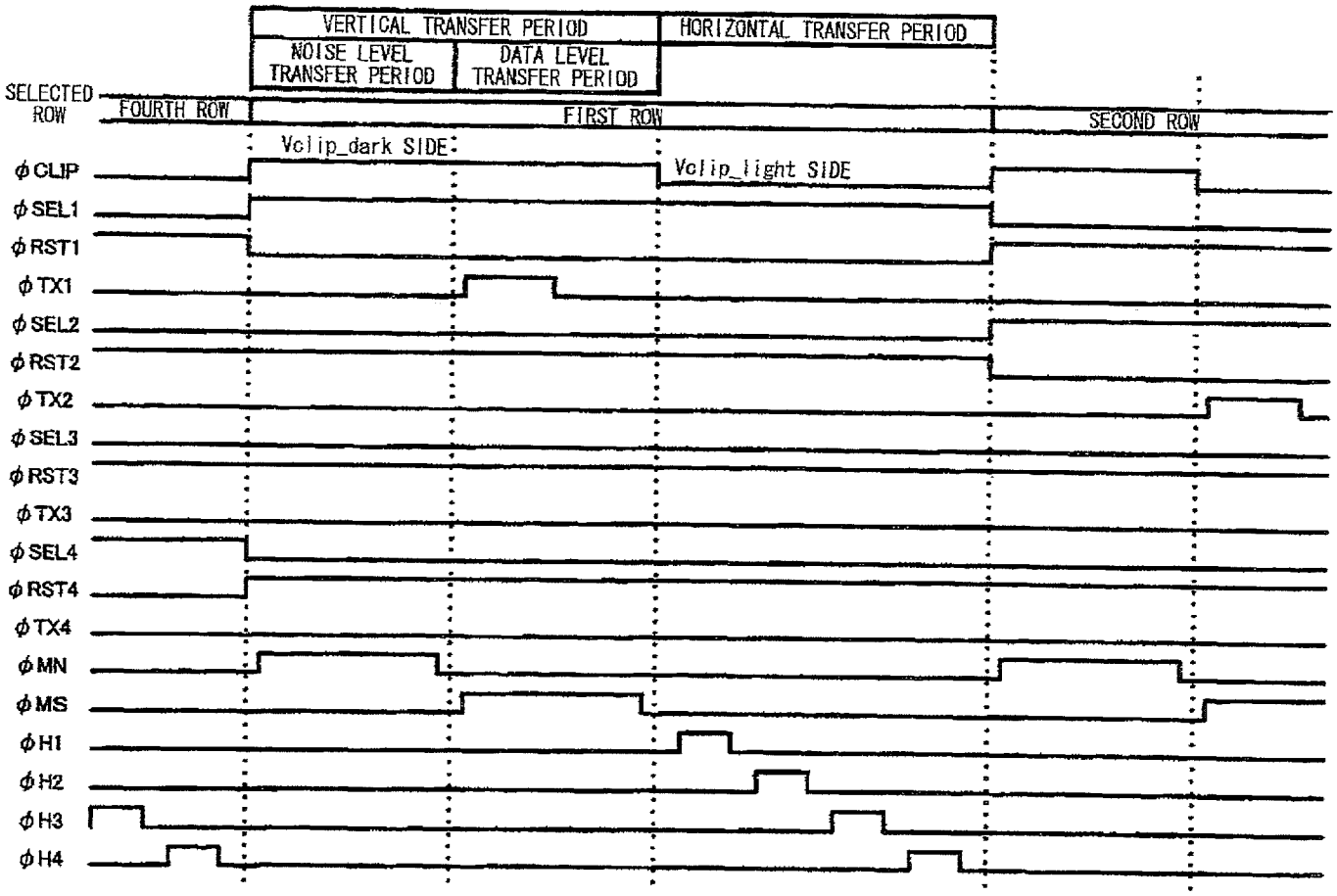
FIG. 4 is a timing chart illustrating a reading operation in the sequential imaging mode of the solid state imaging device according to a second embodiment.

FIG. 4 is a timing chart illustrating a reading operation in a sequential imaging mode of a solid state imaging device according to a second embodiment of the present invention. FIG. 4 illustrates that the pixels PX of the first row are selected and states before and after the selection. In FIG. 4, elements which are the same as or corresponding to those in FIG. 2 are denoted by the same reference symbols, and duplicated descriptions thereof are omitted.

The circuit diagram of the solid state imaging device according to the second embodiment of the present invention is the same as the circuit diagram (FIG. 3) of the solid state imaging device according to the comparative example, and thus illustration thereof is omitted.

The solid state imaging device according to this embodiment is different from the solid state imaging device according to the comparative example only as follows. In the comparative example, not only in the selection period of the second row to the fourth row but also in the selection period of the first row in the sequential imaging mode, only during the noise level transfer period the switching control signal ϕCLIP is turned to high level, and the predetermined potential clip_dark is supplied to the gates of the clip transistors CL1 to CL4 of the first column to the fourth column by the switching circuit SW. Further, in the comparative example, during the data level transfer period and the horizontal transfer period, the switching control signal ϕCLIP is turned to low level, and the predetermined potential clip_light is supplied to the gates of the clip transistors CL1 to CL4 of the first column to the fourth column by the switching circuit SW.

In this embodiment, on the other hand, in the selection period of the first row in the sequential imaging mode, differently from the selection period of the second row to the fourth row, the switching control signal ϕCLIP is turned to high level during both the noise level transfer period and the data level transfer period, and the predetermined potential clip_dark is supplied to the gates of the clip transistors CL1 to CL4 of the first column to the fourth column by the switching circuit SW. Further, in this embodiment, during the horizontal transfer period, the switching control signal ϕCLIP is turned to low level, and the predetermined potential clip_light is supplied to the gates of the clip transistors CL1 to CL4 of the first column to the fourth column by the switching circuit SW.

Therefore, in the comparative example, regarding the OB pixels PX11, PX12, PX13, PX14 of the first row in the sequential imaging mode, the noise level is limited to the dark sun preventing potential, and meanwhile the data level is limited to the current value variation suppressing potential. Accordingly, in the comparative example, if any of the OB pixels has failed and the white defect has occurred, the noise level and the data level are different. Thus, the white defect becomes manifest, and the quality of the obtained image decreases.

In this embodiment, on the other hand, regarding the OB pixels PX11, PX12, PX13, PX14 of the first row, the noise level and the data level are limited to the dark sun preventing potential. Accordingly, in this embodiment, if any of the OB pixels has failed and the white defect has occurred, both the noise level and the data level become the dark sun preventing potential, and the noise level and the data level become the same level. Accordingly, the white defect does not become manifest and has no influence on the obtained image.

Therefore, in the comparative example, when the white defect has occurred in any one of the OB pixels PX11, PX12, PX13, PX14 of the first row, this solid state imaging device becomes a defective product, and the yield decreases. In this embodiment, on the other hand, even when the white defect has occurred in any one of the OB pixels PX11, PX12, PX13, PX14 of the first row, this solid state imaging device does not become a defective product, and the yield improves.

In this manner, also in the second embodiment, the number of OB pixels PX in which the white defect becomes manifest can be decreased as compared to the comparative example, and thus the yield can be improved as compared to the comparative example.

In addition, this embodiment is an example having only one OB pixel row, but when there are two or more OB pixel rows, in the selection period of all the OB pixel rows in the sequential imaging mode, the switching control signal ϕCLIP may be turned to high level during both the noise level transfer period and the data level transfer period. Alternatively, in the selection period of part of the OB pixel rows, the switching control signal ϕCLIP may be turned to high level in both the noise level transfer period and the data level transfer period, and meanwhile, in the selection period of the remaining OR pixel rows, the switching control signal ϕCLIP may be turned to high level during the noise level transfer period, and the switching control signal ϕCLIP may be turned to low level during the data level transfer period.

[Third Embodiment]

The circuit diagram of a solid state imaging device according to a third embodiment of the present invention is the same as the circuit diagram (FIG. 1) of the solid state imaging device according to the first embodiment, and thus illustration thereof is omitted. Further, the timing chart illustrating a reading operation in the sequential imaging mode of the solid state imaging device according to this embodiment is the same as the timing chart (FIG. 4) of the reading operation in the sequential imaging mode of the second solid state imaging device, and thus illustration thereof is omitted.

The solid state imaging device according to this embodiment differs from the solid state imaging device according to the first embodiment only as follows. In the first embodiment, not only in the selection period of the second row to the fourth row but also in the selection period of the first row in the sequential imaging mode, only during the noise level transfer period the switching control signal ϕCLIP is turned to high level, and the predetermined potential clip_dark is supplied to the gates of the clip transistors CL2 to CL4 of the second column to the fourth column by the switching circuit SW. Further, in the first embodiment, during the data level transfer period and the horizontal transfer period, the switching control signal ϕCLIP is turned to low level, and the predetermined potential clip_light is supplied to the gates of the clip transistors CL2 to CL4 of the second column to the fourth column by the switching circuit SW. In this embodiment, on the other hand, in the selection period of the first row in the sequential imaging mode, differently from the selection period of the second row to the fourth row, the switching control signal ϕCLIP is turned to high level during both the noise level transfer period and the data level transfer period, and the predetermined potential clip_dark is supplied to the gates of the clip transistors CL2 to CL4 of the second column to the fourth column by the switching circuit SW. Further, in this embodiment, during the horizontal transfer period, the switching control signal ϕCLIP is turned to low level, and the predetermined potential clip_light is supplied to the gates of the clip transistors CL2 to CL4 of the second column to the fourth column by the switching circuit SW.

Therefore, in the first embodiment, regarding the OB pixels PX12, PX13, PX14 of the first row in the sequential imaging mode, the noise level is limited to the dark sun preventing potential, and meanwhile the data level is limited to the current value variation suppressing potential. Accordingly, if any of the OB pixels has failed and the white defect has occurred, the noise level and the data level are different. Thus, the white defect becomes manifest, and the quality of the obtained image decreases. In this embodiment, on the other hand, regarding the OB pixels PX12, PX13, PX14 of the first row, the noise level and the data level are limited to the dark sun preventing potential. Accordingly, if any of the OB pixels has failed and the white defect has occurred, both the noise level and the data level become the dark sun preventing potential, and the noise level and the data level become the same level. Accordingly, the white defect does not manifest and has no influence on the obtained image.

Therefore, in the first embodiment, when the white defect has occurred in any one of the OB pixels PX12, PX13, PX14 of the first row, this solid state imaging device becomes a defective product. In this embodiment, on the other hand, even when the white defect has occurred in any one of the OB pixels PX12, PX13, PX14 of the first row, this solid state imaging device does not become a defective product. Of course, also in this embodiment, similarly to the first embodiment, even when the white defect has occurred in any one of the OB pixels PX11, PX21, PX31, PX41 of the first column, this solid state imaging device does not become a defective product.

Thus, according to this embodiment, as compared not only to the comparative example but also to the first embodiment, the number of OB pixels PX in which the white defect becomes manifest can be decreased, and the yield can be improved further.

In addition, although this embodiment is an example having only one OB pixel column and only one OB pixel row, the present invention is not limited to this. When there are two or more OB pixel columns, the gates of the clip transistors CL corresponding to all the OB pixel columns may he coupled constantly to the predetermined potential Vclip_dark via wires. Alternatively, the gates of the clip transistors CL corresponding to part of the OB pixel columns may be coupled constantly to the predetermined potential Vclip_dark via wires, and meanwhile the gates of the clip transistors CL corresponding to the remaining OB pixel columns may be coupled to the output part d of the switching circuit SW. Further, when there are two or more OB pixel columns, in the selection period of all the OB pixel rows in the sequential imaging mode, the switching control signal ϕCLIP may be turned to high level during both the noise level transfer period and the data level transfer period. Alternatively, in the selection period of part of the OB pixel rows, the switching control signal ϕCLIP is turned to high level during both the noise level transfer period and the data level transfer period, and meanwhile in the selection period of the remaining OR pixel rows, the switching control signal ϕCLIP may be turned to high level during the noise level transfer period, and the switching control signal ϕCLIP may be turned to low level during the data level transfer period.

[Supplemental Items of the Embodiments]

In the foregoing, although the respective embodiments of the present invention have been described, the present invention is not limited to these embodiments. For example, the camera in which the solid state imaging device of the present invention is mounted is not limited to a digital still camera capable of having a live view mode or a moving-image imaging mode, and may be a video camera dedicated to imaging of moving images, or the like.

Further, in the above-described respective embodiments, during the reading period of the pixel row/pixel column formed of optical black pixels, the gate potential providing unit provides the same potential (clip_dark) to the gate of a clip transistor when reading the noise level and when reading the data level from the optical black pixels corresponding to this clip transistor. However, the present invention does not require that the potential supplied when reading the noise level from the optical black pixels and the potential supplied when reading the data level from the optical black pixels are completely the same. That is, the present invention naturally includes a structure such that the potential supplied when reading the noise level from the optical black pixels and the potential supplied when reading the data level from the optical black pixels are different values in a tolerable error range.

Additionally, in the respective embodiments, for example, a contact may be provided in the switching circuit SW to supply a potential which slightly differs from the Vclip_dark in a tolerable error range. Then, by switching the switching circuit SW, the potential supplied when reading the noise level from the optical black pixels and the potential supplied when reading the data level from the optical black pixels are different values in the tolerable error range (illustrating of this case is omitted).

The many features and advantages of the embodiments are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

[1. A solid state imaging device, comprising;

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing a first potential to a gate of one of the transistors corresponding to at least one pixel column formed of the optical black pixels when reading a noise level from the pixels corresponding to the transistors and when reading a data level from the pixels corresponding to the transistors, wherein the gate potential providing unit provides the first potential to gates of the transistors corresponding to pixel columns excluding the at least one pixel column when reading a noise level from the pixels corresponding to the transistors and provides a second potential when reading a data level from the pixels corresponding to the transistors at least in a predetermined operating mode.]

[2. The solid state imaging device according to claim 1, further comprising a difference obtaining unit obtaining a difference between the noise level and the data level read from the respective pixels.]

[3. The solid state imaging according to claim 1, wherein the first potential is higher than the second potential.]

[4. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing a first potential to gates of the respective transistors during a reading period of at least one pixel row formed of the optical black pixels when reading a noise level from the pixels corresponding to the transistors and when reading a data level from the pixels corresponding to the transistors, wherein the gate potential providing unit provides the first potential to gates of the respective transistors during a reading period of pixel rows excluding the at least one pixel row when reading a noise level from the pixels corresponding to the transistors and provides a second potential when reading a data level from the pixels corresponding to the transistors at least in a predetermined operating mod.]

[5. The solid state imaging device according to claim 4, further comprising a difference obtaining unit obtaining a difference between the noise level and the data level read from the respective pixels.]

[6. The solid state imaging device according to claim 4, wherein the first potential is higher than the second potential.]

[7. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the plurality of pixels and supplied with output signals of the pixels;

a plurality of transistors provided corresponding to the respective signal lines and limiting a potential of the signal lines based on a gate potential; and a gate potential providing unit providing a gate potential to gates of the respective transistors, wherein:

the gate potential providing unit provides a first potential to a gate of one of the transistors corresponding to at least one pixel column formed of the optical black pixels when reading a noise level from the pixels corresponding to the transistors and when reading a data level from the pixels corresponding to the transistors at least in a predetermined operating mode;

the gate potential providing unit provides the first potential to gates of the respective transistors during a reading period of at least one pixel row formed of the optical black pixels when reading a noise level and when reading a data level from the pixels corresponding to the transistors at least in the predetermined operating mode;

the gate potential providing unit provides the first potential to gates of the transistors corresponding to pixel columns excluding the at least one pixel column when reading a noise level and provides a second potential when reading a data level from the pixels corresponding to the transistors at least in the predetermined operating mode; and the gate potential providing unit provides the first potential to gates of the transistors corresponding to pixel columns excluding the at least one pixel column during a reading period of pixel rows excluding the at least one pixel row when reading a noise level and provides the second potential when reading a data level from the pixels corresponding to the transistors at least in the predetermined operating mode.]

[8. The solid state imaging device according to claim 7, further comprising a difference obtaining unit obtaining a difference between the noise level and the data level read from the respective pixels.]

[9. The solid state imaging device according to claim 7, wherein the first potential is higher than the second potential.]

[10. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing a first potential to gates of the transistors provided corresponding to the optical black pixels when reading a noise level and when reading a data level from the optical black pixels wherein the gate potential providing unit provides the first potential to gates of the transistors provided corresponding to the optical black pixels when reading a noise level and provides a second potential when reading a data level from the optical black pixels.]

[11. The solid state imaging device according to claim 10, further comprising a difference obtaining unit obtaining a difference between the noise level and the data level read from the respective pixels.]

[12. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing an aligned potential to gates of the transistors corresponding to pixel columns when reading a noise level from the pixels corresponding to the transistors and when reading a data level from the pixels corresponding to the transistors, wherein the gate potential providing unit provides different potentials to a gate of one of the transistors corresponding to at least one pixel column formed of the optical black pixels when reading the noise level and when reading the data level.]

[13. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing an aligned potential to gates of the transistors corresponding to pixel rows when reading a noise level from the pixels corresponding to the transistors and when reading a data level from the pixels corresponding to the transistors, wherein the gate potential providing unit provides different potentials to the gates of the transistors corresponding to at least one pixel row formed of the optical black pixels when reading the noise level and when reading the data level.]

[14. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the plurality of pixels and supplied with output signals of the pixels;

a plurality of transistors provided corresponding to the respective signal lines and limiting a potential of the signal lines based on a gate potential; and a gate potential providing unit providing a gate potential to gates of the respective transistors, wherein:

the gate potential providing unit provides an aligned potential to a gate of one of the transistors corresponding to at least one pixel column formed of the optical black pixels when reading a noise level from the pixels corresponding to the transistors and when reading a data level from the pixels corresponding to the transistors at least in a predetermined operating mode;

the gate potential providing unit provides an aligned potential to gates of the respective transistors during a reading period of at least one pixel row formed of the optical black pixels when reading a noise level and when reading a data level from the pixels corresponding to the transistors at least in the predetermined operating mode;

the gate potential providing unit provides different potentials to gates of the transistors corresponding to pixel columns excluding the at least one pixel column when reading a noise level and when reading a data level from the pixels corresponding to the transistors at least in the predetermined operating mode; and the gate potential providing unit provides different potentials to gates of the transistors corresponding to pixel columns excluding the at least one pixel column during a reading period of pixel rows excluding the at least one pixel row when reading a noise level and when reading a data level from the pixels corresponding to the transistors at least in the predetermined operating mode.]

[15. A solid state imaging device, comprising:

a plurality of pixels disposed two-dimensionally including effective pixels generating a signal corresponding to incident light and optical black pixels generating a signal at a black standard level;

a plurality of signal lines provided corresponding to each column of the pixels and supplied with output signals of the pixels;

a plurality of transistors provided corresponding to the respective signal lines and limiting a potential of the signal lines based on a gate potential; and a gate potential providing unit providing an aligned potential to gates of the transistors corresponding to the pixels when reading a noise level from the pixels and when reading a data level from the pixels, wherein the gate potential providing unit provides an aligned potential to gates of the transistors corresponding to the optical black pixels when reading the noise level and the data level from the optical black pixels.]

*16. An imaging sensor comprising:*

*a plurality of first photoelectric converters that are arranged in a first direction and that photoelectrically convert light to generate a charge;*

*a plurality of first output units that are arranged in the first direction and that output a first signal based on the charge generated by the first photoelectric converters;*

*a first output line that is wired in the first direction and that outputs a signal from each of the plurality of first output units;*

*a plurality of second output units (i) that are arranged in the first direction, (ii) that are provided at a shielding area in which incident light is shielded, and (iii) that output a signal;*

*a second output line that is wired in the first direction and that outputs the signal from each of the plurality of second output units; and*

*a supplying unit capable of supplying one of a first voltage and a second voltage, which is different from the first voltage, to the first output line, and capable of supplying the second voltage to the second output line,*

*wherein the supplying unit supplies the first voltage to the first output line when the first signal is output from the first output units, supplies the second voltage to the first output line when a second signal for removing a noise of the first signal is output from the first output units, and supplies the second voltage to the second output line when the signal is output from the second output units.*

*17. The imaging sensor according to claim 16, wherein*

*the supplying unit is capable of supplying the first voltage based on a third voltage, and is capable of supplying the second voltage based on a fourth voltage.*

*18. The imaging sensor according to claim 17, wherein*

*the supplying unit has a first wire supplying one of the third voltage and the fourth voltage, and a second wire supplying the fourth voltage.*

*19. The imaging sensor according to claim 18, wherein*

*the supplying unit has a first coupling unit capable of coupling the first wire with the first output line electrically, and a second coupling unit capable of coupling the second wire with the second output line electrically.*

*20. The imaging sensor according to claim 19, wherein*

*the second wire and the second coupling unit are coupled constantly to each other electrically.*

*21. The imaging sensor according to claim 18, wherein*

*the supplying unit has a switching unit capable of switching whether to supply one of the third voltage and the fourth voltage to the first wire.*

*22. The imaging sensor according to claim 17, wherein:*

*the supplying unit has a first wire supplying one of the third voltage and the fourth voltage; and*

*the supplying unit supplies the third voltage to the first wire so as to supply the first voltage to the first output line when the first signal is output from the first output units, and*

*the supplying unit supplies the fourth voltage to the first wire so as to supply the second voltage to the first output line when the second signal is output from the first output units.*

*23. The imaging sensor according to claim 22, wherein:*

*the supplying unit has a first coupling unit capable of coupling the first wire with the first output line electrically; and*

*the supplying unit supplies one of the third voltage and the fourth voltage to the first wire so as to supply one of the first voltage and the second voltage to the first output line via the first coupling unit when one of the first signal and the second signal is output from the first output units.*

*24. The imaging sensor according to claim 22, wherein*

*the supplying unit has a switching unit capable of switching whether to supply one of the third voltage and the fourth voltage to the first wire.*

*25. The imaging sensor according to claim 24, wherein*

*the switching unit switches between (i) the supply to supply the third voltage to the first wire when the first signal is output from the first output units and (ii) the supply to supply the fourth voltage to the first wire when the second signal is output from the first output units.*

*26. The imaging sensor according to claim 17, wherein:*

*the supplying unit has a second wire supplying the fourth voltage, and the supplying unit has a second coupling unit capable of coupling the second wire with the second output line electrically; and*

*the supplying unit supplies the fourth voltage to the second wire so as to supply the second voltage to the second output line via the second coupling unit when the signal is output from the second output units.*

*27. The imaging sensor according to claim 26, wherein*

*the second wire and the second coupling unit are coupled constantly to each other electrically.*

*28. An imaging device comprising:*

*the imaging sensor according to claim 16; and*

*a generator generating image data based on a signal output from the imaging sensor.*

* * * * *